United States Patent
Coroban-Schramel

(10) Patent No.: US 11,177,745 B2
(45) Date of Patent: Nov. 16, 2021

(54) ELECTRIC MOTOR APPARATUS

(71) Applicant: ZF Automotive UK Limited, Solihull (GB)

(72) Inventor: Vasile Coroban-Schramel, Warwick (GB)

(73) Assignee: ZF Automotive UK Limited

( * ) Notice: Subject to any disclaimer, the term of this patent is extended or adjusted under 35 U.S.C. 154(b) by 76 days.

(21) Appl. No.: 15/931,774

(22) Filed: May 14, 2020

(65) Prior Publication Data

US 2020/0366223 A1  Nov. 19, 2020

(30) Foreign Application Priority Data

May 15, 2019 (GB) ..................................... 1906824

(51) Int. Cl.
*H02P 6/28* (2016.01)
*H02P 6/34* (2016.01)
*B62D 5/04* (2006.01)

(52) U.S. Cl.
CPC ............... *H02P 6/28* (2016.02); *B62D 5/046* (2013.01); *B62D 5/0409* (2013.01); *B62D 5/0481* (2013.01); *H02P 6/34* (2016.02)

(58) Field of Classification Search
CPC ............. H02P 6/28; H02P 6/34; B62D 5/0409

USPC ............................... 318/400.15, 400.01, 700
See application file for complete search history.

(56) References Cited

U.S. PATENT DOCUMENTS

| | | | |
|---|---|---|---|
| 7,772,790 B2 * | 8/2010 | Nashiki | H02P 25/08 318/400.02 |
| 2017/0129534 A1 | 5/2017 | Sone | |
| 2019/0002012 A1 | 1/2019 | Khafagy et al. | |

* cited by examiner

*Primary Examiner* — David Luo
(74) *Attorney, Agent, or Firm* — Robert James Harwood

(57) ABSTRACT

An electric motor apparatus having a controller and a torque demand signal modifier. The controller may produce a set signals to a drive stage of the motor where the drive stage applies a voltage to each phase of the motor to cause currents to flow in each phase of the motor corresponding to a current demand signal fed into the controller. The torque demand signal modifier may receive a target torque demand signal representative of a target torque demanded from the motor and outputs an actual torque demand signal which is converted into the current demand signal that is fed to the controller. The actual torque demand increases in value as a function of time towards the target torque demand value following a predefined ramp selected to ensure that the maximum current gradient of the current demand does not exceed a predetermined limit.

11 Claims, 5 Drawing Sheets

ELECTRIC MOTOR APPARATUS

CROSS-REFERENCE TO RELATED APPLICATION

This application claims priority to UK Patent Application No. 1906824.6 filed May 15, 2019, the disclosure of which is incorporated herein by reference in its entirety.

TECHNICAL FIELD

This present disclosure relates to an electric motor apparatus.

BACKGROUND

Electric motors are widely used and are increasingly common in automotive applications. For example it is known to provide an electrically power assisted steering system in which an electric motor apparatus applies an assistance torque to a part of a steering system to make it easier for the driver to turn the wheels of the vehicle. The magnitude of the assistance torque is determined according to a control algorithm which receives as an input one or more parameters such as the torque applied to the steering column by the driver turning the wheel, the vehicle speed and so on.

For accurate control of the motor torque it is essential to have control over the current applied to the motor. Typically a star connected three phase motor operated according to a Pulse width modulation control/drive strategy is used, each phase being connected to upper and lower drive stage switches connected to the battery supply and an earth respectively. In a PWM strategy each phase is driven with a cyclic PWM drive signal having a first state and a second state and a duty ratio indicative of the ratio of the time spent in each state in a cycle. The torque required from the motor is determined as a torque demand signal which is then fed into a current controller which generates appropriate d-q axis motor current demand signals that will cause the motor to generate that torque. These d-q signals, which may be expressed as either a current or a voltage required to achieve the required currents, are then converted as required by a drive circuit into three phase waveforms in the static frame of reference, which requires knowledge of the motor rotor electrical angle of position. A position sensor may be provided that measures the rotor position or the system may be of the sensorless type, such as that taught in WO 2004/023639. Finally, using measurements of the actual current as feedback the pulse width modulation (PWM) duty cycles for each phase that are needed to produce the required actual average currents are calculated and used to drive the motor phases.

The motor draws current from the electrical supply of the vehicle, typically a battery which is topped up by an alternator that is driven by the drive train of the vehicle either taking power from the engine or regenerative power during braking. The current drawn by the motor is a function of the battery voltage and the duty ratio of the drive signal applied to each phase.

At times where high assistance is required, the duty ratio of the switches will be high and the overall current drawn by the motor from the battery will in turn be high. For a healthy vehicle electrical system, the high current demand can generally be met by the alternator so the battery does not become depleted. The maximum current draw of the motor should be set to a level which can be met by the alternator to prevent the battery becoming depleted.

When an increase in torque is demanded, the currents in the motor must be increased to meet the new demand. This cannot happen instantly. There is a limit to the rate at which it can be safely increased without depleting or damaging the battery or exceeding the capabilities of a dc/dc converter in the case of many current and proposed vehicle designs. It is important in many cases that the peak rate of increase in current, the peak current gradient, does not exceed a limit which cannot be met by the battery or an alternator feeding the battery. For this reason, the torque demand fed to the controller will increase or decrease in a manner determined by a predefined ramp. The ramp defines a rate of increase in torque demand for each point in time along the ramp. The ramp will generally be exponential in shape at zero or low speed but may typically be a different shape at high speeds.

The ramp shape is generally chosen such that in the most extreme case—where the target torque demand changes from zero torque demand to a maximum torque demand, the peak gradient which will occur at the end of the ramp will not exceed the gradient limit.

SUMMARY

According to a first aspect the present disclosure provides an electric motor apparatus for controlling an electric motor supplied by a source, such as a battery or a dc/dc converter, in which the electric motor apparatus comprises:

a controller arranged to produce as an output a set signals that are fed to a drive stage of the motor, in which the drive stage is arranged to apply a voltage to each phase of the motor to cause currents to flow in each phase of the motor corresponding to a current demand signal fed into the controller, a torque demand signal modifier that receives as an input a target torque demand signal representative of a target torque demanded from the motor and outputs an actual torque demand signal that is converted into the current demand signal that is fed to the controller, the actual torque demand increasing in value as a function of time towards the target torque demand value following a predefined ramp selected to ensure that the maximum current gradient of the current demand does not exceed a predetermined limit when the voltage supplied by the battery is at a nominal value corresponding to the battery being fully charged, and in which the torque demand signal modifier is arranged to modify the predefined ramp as a function of the battery voltage such that the maximum current gradient generated matches a predefined current gradient limit value By modifying the shape of the ramp used to increase the motor torque from its instant value to the target demand value to match the current limit the applicant has appreciated that the time taken to reach the target torque demand value can be reduced without exceeding the current gradient limit. By matching to the limit the time to reach the target torque demand will be reduced to an optimum time. Prior to this realisation, the ramp rate would be fixed leading to a suboptimal time to reach the target torque from the motor.

The torque demand signal modifier may modify the ramp such that at lower battery voltages the rate of increase of torque demand towards the target at all points along the ramp is boosted compared with a higher battery voltage. This may be achieved by applying a positive scaling factor to the ramp.

The predefined ramp may be chosen such that on increasing the demanded motor torque from zero voltage to a maximum target voltage equal to the battery voltage the gradient at the final part of the ramp matches the predetermined gradient limit.

The applicant has appreciated that where the battery voltage is lower, the maximum torque available will be reduced and so the full default ramp will not be used and hence the steepest part of the ramp which generates the highest current gradient will not be used. This means that the peak gradient will be below the gradient limit and hence provide a sub-optimal ramp up time. The present disclosure lies in boosted the overall ramp so that the gradient at all points is increased, reducing the time taken to reach the target voltage at the motor phases without a gradient limit being exceeded.

The apparatus may therefore boost the ramp when the battery source voltage is lower than the nominal battery voltage. The effect is to keep the shape of the ramp the same but to reduce the time taken to reach the final value. The more the battery voltage is reduced, the more the ramp can be boosted.

The ramp may be boosted by applying a scaling factor and multiplying the ramp by the scaling factor.

As explained above, the predefined ramp shape may be selected such that the peak torque gradient does not exceed a value which would draw current from the motor above a predefined rate. This rate may be selected to be below a rate at which the battery can be replenished by an alternator connector to the battery, so that over time the battery does not become depleted.

Typically the battery source will include a battery connected to an alternator which keeps the battery topped up and provides power to the electric motor when the engine of the vehicle is running. Therefore, in so far as the present disclosure refers to drawing current from a power supply it should be construed in general terms as the overall current being drawn from a battery, a battery and an alternator or just an alternator. The latter case would be applicable where the battery has been disconnected.

The torque demand signal modifier may generate one or more of the current limits as a function of the battery terminal voltage, for instance using a look up table.

In addition to modifying the ramp as a function of battery voltage, the torque demand signal modifier may determine a torque demand gradient using a model of the motor that includes a plurality of motor parameters. These may be selected from a non-exhaustive list comprising: Motor stator equivalent resistance, Motor temperature, Motor mechanical velocity, Motor torque constant, Motor maximum bridge power and Motor bridge equivalent resistance.

Using the model allows a good estimate of the motor current and motor current gradient for a given battery voltage and target torque demand to be obtained.

The torque demand signal modifier may comprise a signal processing circuit. It may include a processor and memory in which determined values and parameter are stored.

The torque demand signal modifier may set limits for the torque demand gradient based on the battery voltage and a model of the motor parameters. The model relates the torque to the motor current for a given motor operating condition and may include variables such as the motor phase inductances and the motor temperature.

The applicant has appreciated that this model may not always prevent the battery current gradient exceeding an allowed limit. This may be the case where the motor circuit model is inaccurate, for instance if the temperature has changed rapidly and the model is not taking account of temperature. It may occur where the model is pre-set for a batch of circuits and the motors and drive stages used in each circuit are slightly different.

Therefore the apparatus may include a current monitor which monitors the actual current demand values from the current controller, or the motor actual current values, or calculates estimates of the current values, and determine an actual current gradient from those values and in the event that this exceeds the current gradient limit the torque demand gradient limiter is arranged to reduce the amount of boost of the ramp that is applied. The apparatus of the present disclosure may then modify the ramp to reduce the current gradient at all points along the ramp as a result.

The monitoring of the actual or estimated currents or the current demand gradients may form part of a feedback control loop so that the torque demand limits are driven to the optimum values to limit the currents drawn from or fed into the battery.

By monitoring the current gradients of the actual current in the motor and feeding back to the torque gradient limiter where the current limit is exceeded, any slight errors in the model can be accommodated. Because this is only correcting what should be small errors, the response time of the feedback loop can be relatively high.

The drive stage may convert the signals output from the controller into a pulse width modulated waveform (PWM) for each phase of the motor with cyclic pulse width modulated (PWM) drive signals having a first state and a second state and a duty ratio indicative of the ratio of the time spent in each state within a cycle. Where the controller outputs a current demand signal, the drive stage may combine the motor current demand signals together with a signal representative of the duty ratio of the PWM signal applied to each phase to determine estimates of the current drawn from the electrical supply, and limit the rate of change of current drawn from the electrical supply by the motor by modifying the motor torque demand signals. The current draw estimate can be expressed as:

$$I = da \cdot Ia\_demand + db \cdot Ib\_demand + dc \cdot Ic\_demand + I_{ECU}$$

where I=estimate of current drawn;
da, db, dc are the duty ratios for the PWM signal for each of the phases a, b and c;
Ia_demand, Ib_demand, Ic_demand are the instantaneous demanded phase currents during the conductive part of the PWM cycle; and
$I_{ECU}$ is an optional offset to account for current drawn by the processing ECU.

The demand signals output from the current controller may comprise d q current components and the strategy may comprise producing from these components the three phase demand currents for each phase in the alpha-beta frame. This may already be available from the controller but if not the strategy may comprise deriving these using the following equations:

$$\begin{cases} I_{a\_demand} = I_{alpha\_demand} \\ I_{b\_demand} = \frac{1}{2}\left(\sqrt{3}\, I_{beta\_demand} - I_{alpha\_demand}\right) \\ I_{c\_demand} = -(I_{a\_demand} + I_{b\_demand}) \end{cases}$$

$$\begin{cases} I_{alpha\_demand} = I_{d\_demand} \cdot \cos(\theta_{predict}) - I_{q\_demand} \cdot \sin(\theta_{predict}) \\ I_{beta\_demand} = I_{d\_demand} \cdot \sin(\theta_{predict}) + I_{q\_demand} \cdot \cos(\theta_{predict}) \end{cases}$$

Where $I_{alpha\_demand}$ and $I_{beta\_demand}$ are the current components in the stationary alpha-beta frame, $I_{d\_demand}$ and $I_{q\_demand}$ are the d and q axis current demand signals, and θ is the rotor electrical position.

The current controller may comprise a PI (or PID) controller. It may include a conversion means for converting the actual torque demand signal into an actual current demand signal representative of an actual overall current demanded from the motor which will cause the motor to generate the actual demanded torque.

The torque demand generator may receive as an input a measure of the torque in a steering part of the electric power steering system and may determine a target torque demand value as a function of the measured torque. A map may be used that relates the measured torque to the torque demand, as is well known to those familiar with the design of a motor control system.

According to a second aspect the present disclosure provides a method of controlling an electric motor apparatus of the kind comprising an electric motor and a control circuit, the motor and control circuit being supplied by a battery source.

The method comprising receiving a target torque demand signal representative of a target torque demanded from the motor generating an actual torque demand signal that increases in value as a function of time towards the target torque demand value following a predefined ramp selected to ensure that the maximum current gradient does not exceed a predetermined limit when the voltage supplied by the battery is at a nominal value corresponding to the battery being fully charged, produce a set of motor current demand signals from the actual torque demand signal, applying a voltage to each phase of the motor to cause currents to flow in each phase of the motor corresponding to the current demand signals, and further comprising modifying the predefined ramp as a function of the battery voltage such that the maximum current gradient generated matches a predefined current gradient limit value.

BRIEF DESCRIPTION OF THE DRAWINGS

There will now be described by way of example only one embodiment of the present disclosure with reference to the accompanying drawings of which.

DETAILED DESCRIPTION

The motor apparatus of the present disclosure can be used to drive a motor in a wide range of applications. In the following example it is used to drive a motor that applies an assistance torque in a steering system for a vehicle. This is not intended to limit the scope of the present disclosure which is defined by the claims.

Figure 1:
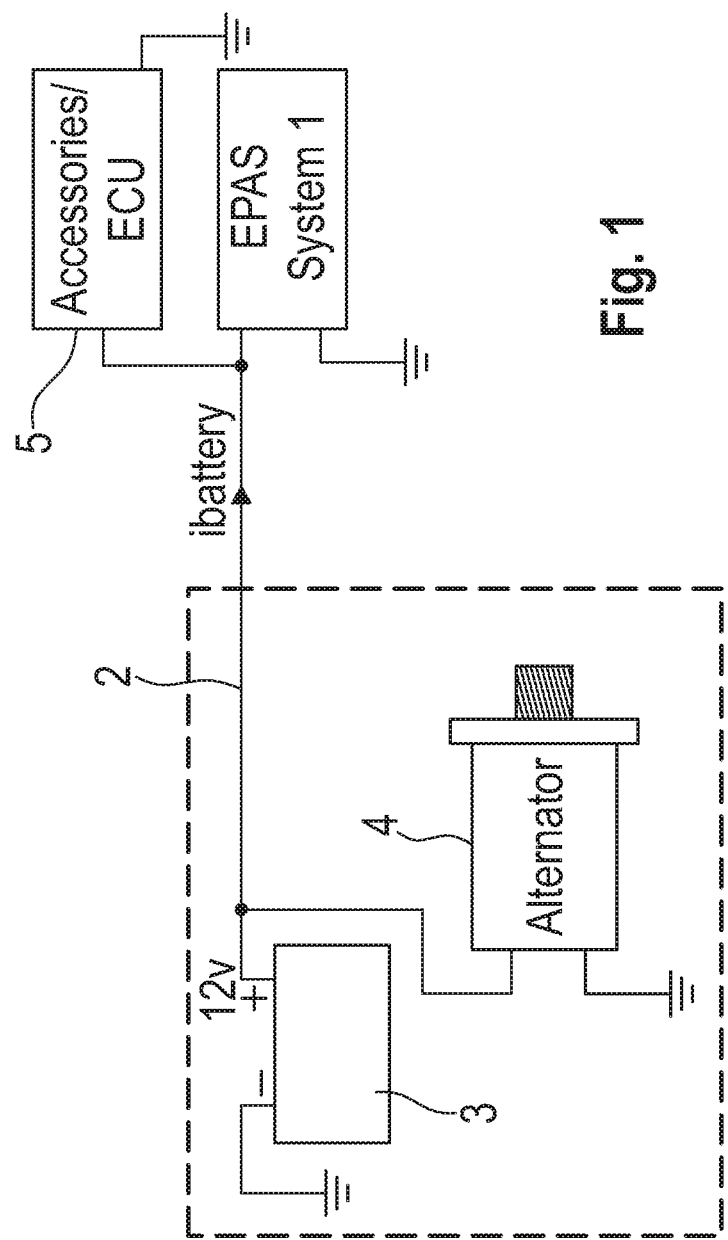
FIG. 1 is an overview of a part of a vehicle electrical system showing the connection of an electric power steering system the electrical supply.

As shown in FIG. 1 a vehicle is provided with an electric power assisted steering (EPAS) system that draws current $I_{battery}$ from the vehicle electrical supply across power rail 2. The supply comprises a battery 3, typically rated at 12 volts DC, which is in turn topped up by an alternator 4. The battery also provides current to other vehicle accessories 5.

Figure 2:
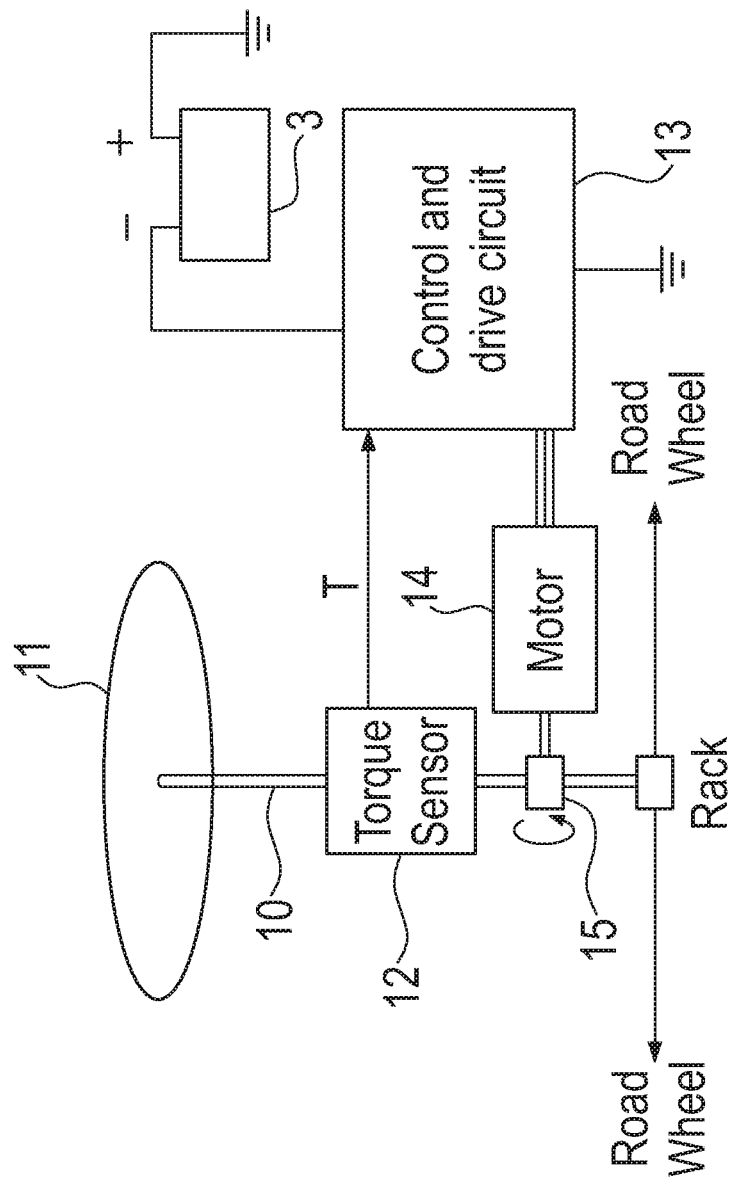
FIG. 2 is a schematic representation of the key parts of an exemplary electric power steering system to which the control strategy of the present disclosure can be applied.

The EPAS system 1 is shown schematically in FIG. 2 of the drawings. It includes a steering column 10 attached to a steering wheel 11, a torque sensor 12 which measures the torque applied to the steering column 10 by the driver as they turn the steering wheel, a motor control and drive circuit 13 and an electric motor 14. The torque sensor 12 may be attached to a quill shaft in series with the column 10, and the motor 14 may act upon the steering column or other part of the steering system, typically through a gearbox 15.

The motor 14 typically comprises a three phase wound stator element and a rotor having for example six embedded magnets within it which in this instance are arranged so as to provide six poles which alternate between north and south around the rotor. The rotor therefore defines three direct or d axes evenly spaced around the rotor and three quadrature or q axes interspaced between the d axes. The d axes are aligned with the magnetic poles of the magnets where the lines of magnetic flux from the rotor are in the radial direction, and the q axes are spaced between the d axes where the lines of magnetic flux from the rotor are in the tangential direction.

Figure 3:
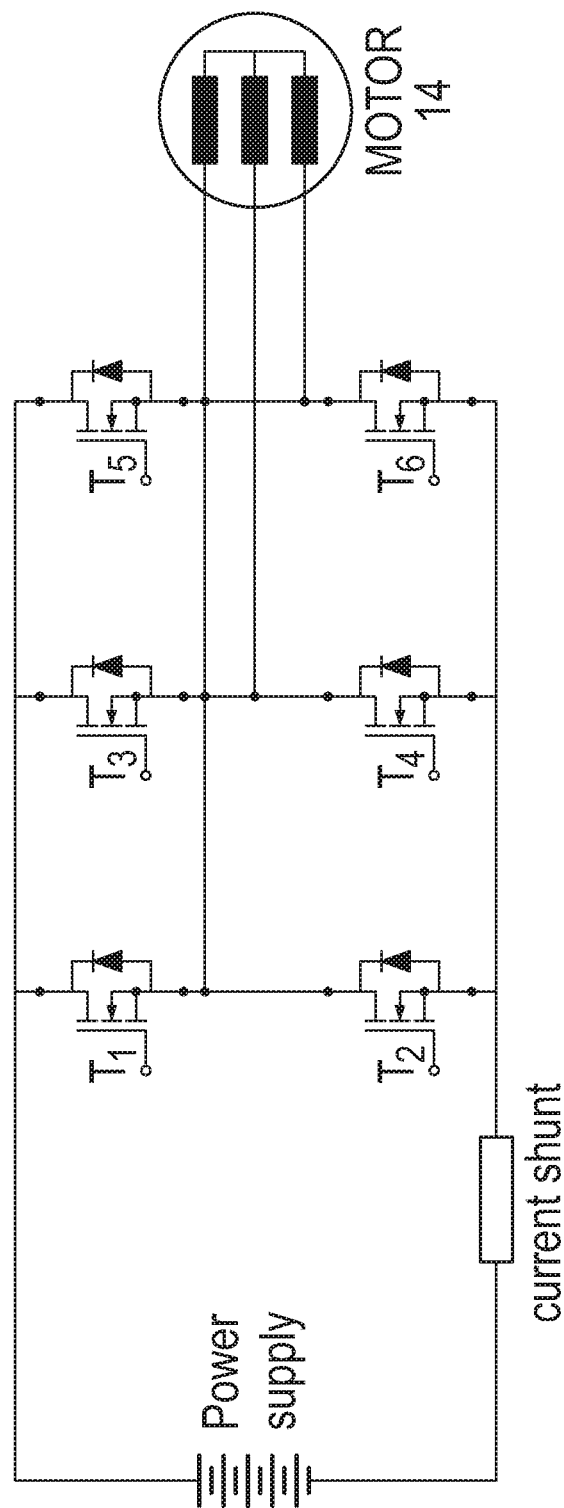
FIG. 3 shows a dual lane motor and motor bridge that may be used within the embodiment of an apparatus of the present disclosure.

The three motor stator windings are connected in a star network. The drive circuit part of the control and drive circuit 13 comprises a three phase bridge forming a switching stage. This is shown in FIG. 3. Each arm of the bridge comprises a pair of switches in the form of a top transistor $T_1$, T3, T5 and a bottom transistor $T_2$, T4, T6 connected in series between the battery supply rail 2 and ground line. The motor windings are each tapped off from between a respective complementary pair of transistors. The transistors are turned on and off in a controlled manner by a control and drive circuit to provide pulse width modulation (PWM) of the potential applied to each of the terminals, thereby to control the potential difference applied across each of the windings and hence also the current flowing through the windings which depends on the duty cycle d for each phase a, b or c of the motor. This in turn controls the strength and orientation of the magnetic field produced by the windings, and in turn the motor torque. In fact as shown in FIG. 3 the motor has dual lanes, so there is a duplicate of the three phases and the three phase bridge. The two lanes can be run in parallel, each providing one half of the motor torque, or used one at a time.

Figure 4:
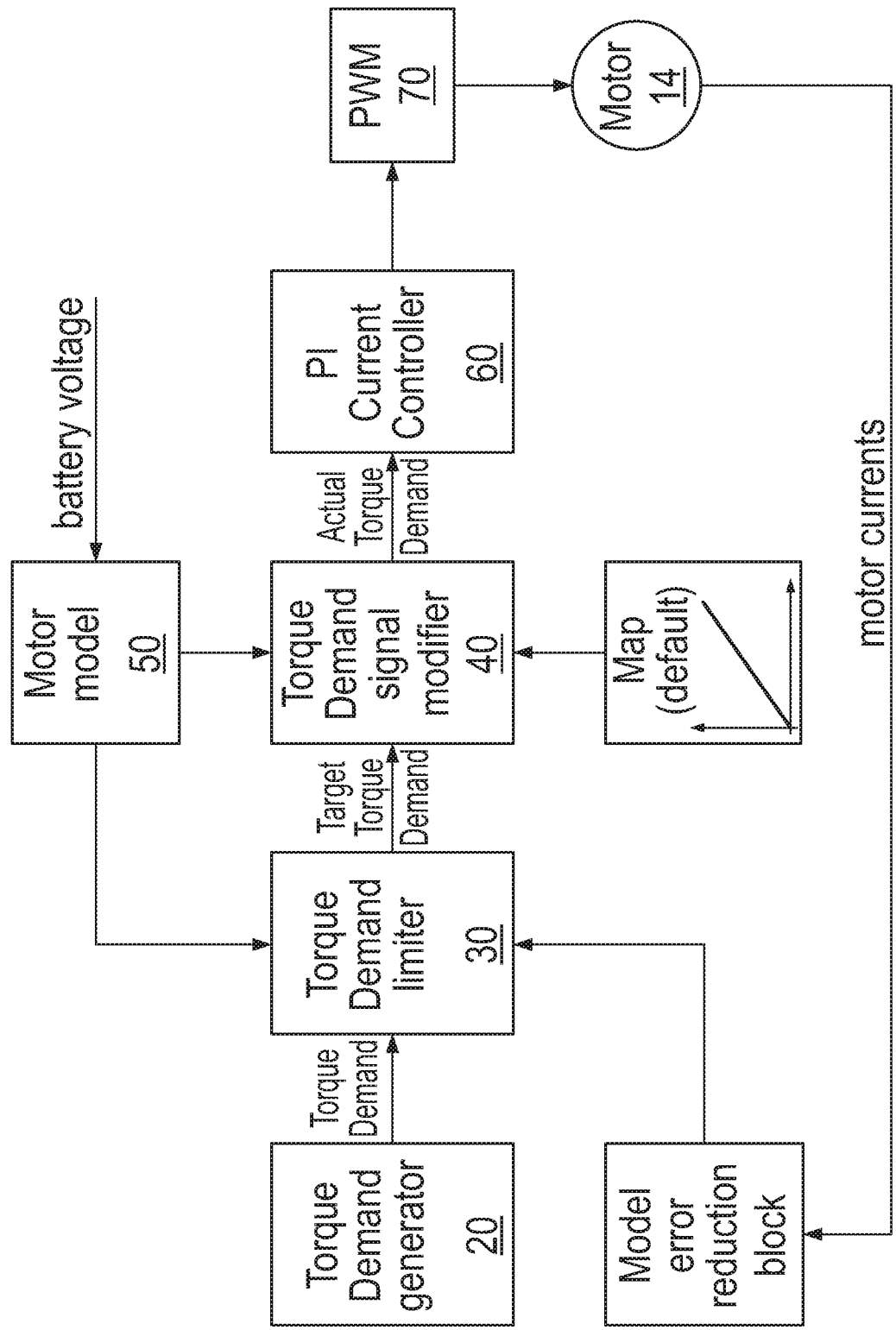
FIG. 4 is a detailed representation of one particular exemplary implementation of the present disclosure.

FIG. 4 shows at a top level how the motor torque is controlled. The torque signal output from the torque sensor 12 is fed to an input of the motor apparatus. This is input to a torque demand generator 20 which generates a torque demand signal. The value of the torque demand signal represents an ideal torque demanded from the motor, for instance to provide an assistance torque to the driver as they turn the steering wheel. The torque demand signal is fed into an optional torque demand limiter 30 that limits the maximum torque that is demanded. The function of this limiter is to limit the peak current that is demanded from the battery and uses a model 50 of the motor to determine the peak torque that would correspond to that peak current.

Following the optional torque demand limiter 30 is a torque demand signal modifier 40. This is used to optimise the current gradients in the motor so as to minimise the time required reaching a target torque whenever an increased torque is demanded. The torque demand signal output from the torque demand signal modifier 40 is fed into a error term controller 60, which typically generates an error term formed from the difference between the current demand and the actual current flowing in the motor and then tries to minimise the value of the error term. The controller outputs signals that are fed to a drive circuit 70 for the motor that aim to reduce the error ideally to zero.

In a final stage, the drive circuit 70 converts the d-q axis currents output from the current controller into three phase demand components in a static reference frame, one for each phase of the motor a, b or c. These components are then converted by the drive circuit, in combination with an estimate of the rotor position, into suitable PWM signals that are supplied to the switching motor phases by PWM of the switches that cause the demanded current to flow in the motor phases. A range of PWM switching strategies are known in the art and so will not be described in detail here. The switch arrangement is well known and described in such documents as EP 1083650A2.

The torque demand signal modifier 40 uses a ramp to control the rate of increase of the torque from an instant value to the target torque demand value. It is important that an overly high sudden jump in demanded torque is not passed to the current controller as this would result in phase voltages being applied to the phases of the motor that will cause the current gradient to exceed the capacity of the battery source power supply (battery or dc/dc converter). Using a gradual ramp ensures that the peak current gradient does not exceed a predefined limit. This ramp will generally be stored in a memory accessible to the torque demand signal limiter.

The torque demand generator 20 and the torque demand signal modifier 40 and optional torque demand signal limiter 30 may be implemented using an electronic control unit running software that is stored in an area of memory. The torque demand signal modifier 40 comprises a ramp up/down algorithm which defines and applies a maximum torque gradient limit for motoring and generating, and applies this limit to the initial torque demand. This is used to modify the ramp that determines the rate of increase, or decrease, of current over time.

The applicant has appreciated that it is desirable to limit the rate of change of current drawn from or fed back to the motor. The applicant has appreciated that through use of a suitable motor model this can be achieved by limiting the torque gradient rather than acting directly on the currents calculated with within the current controller. In addition, the applicant has appreciated that it is desired to optimise the gradient so that the time taken for a target torque to be met by the motor is minimised without exceeding the current gradient limit.

The torque gradient limit is calculated using a model of the motor which receives as an input a plurality of motor parameters. The objective is that for a given battery current gradient limit and for a given phase current gradient limit and for a given motor speed, based on the parameters of the motor circuit model, a torque gradient limit value is set that limits the rate of change of battery current to the given limit.

Figure 5:
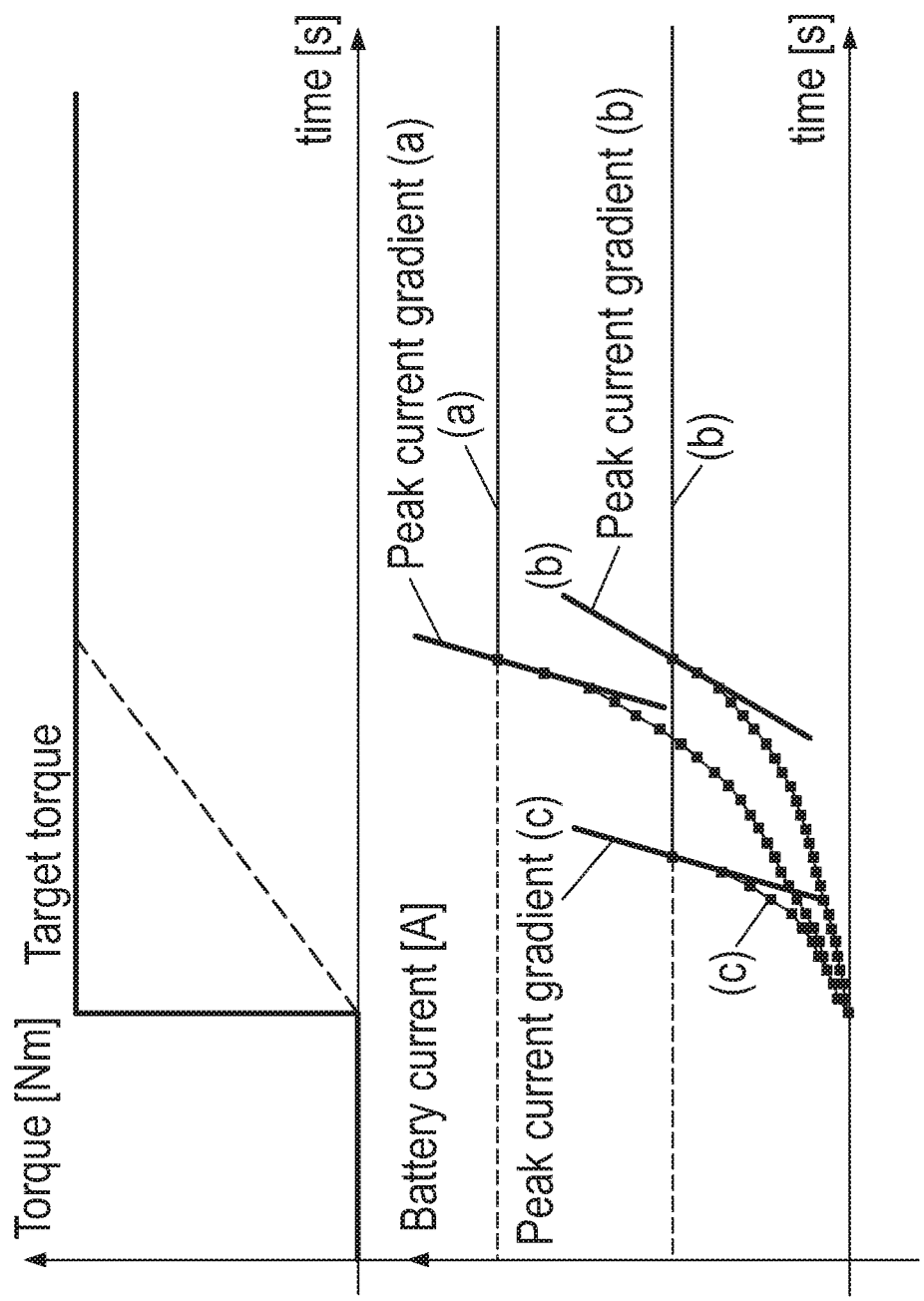
FIG. 5 shows in curve (a) the change in motor current when the actual torque demand changes following a nominal map with a healthy battery, (b) following the map with a partially depleted battery and (c) following a modified map to optimise the time to reach the target torque demand value.

To understand what is meant by torque gradient, FIG. 5 shows a change in battery current demand over time. The solid trace shows the torque ramp used to increase from zero torque to a target torque equal to the maximum torque available from the motor, which is an exponential curve at zero and very low speed only. The peak torque is determined by the motor parameters and the battery voltage when the battery is fully charged. Notably, the shape of the ramp is chosen so that the peak current gradient, which is at the end of the curve, matches a predefined limit set for the circuit.

The dotted line shows how the peak torque is reduced when the battery voltage is lowered, for example when the battery is depleted. It can be seen that the current has been increased following the same ramp. At the end of the ramp, the peak current gradient is below the predefined limit. The dashed line shows the rate of increase where the ramp has been modified as a function of the battery voltage. By boosting the ramp at all points, the peak gradient has been brought back up to the limit and importantly the time taken to reach the limit has been reduced. As can be seen, the map is modified to boost the rate of rise of the torque demand to a level where the highest current gradient matches the current gradient limit.

Model Error Reduction:

In addition to limiting the maximum torque demand gradient as a way to limit the current gradient, the applicant has appreciated that there may be times when the model is insufficiently accurate for the current limit to be achieved by limiting the torque. In a perfect motor, with a perfect model, a torque limit can be set which gives a known current limit. In an imperfect motor or model, the actual current may still exceed the limit. The torque demand limit is an estimated value calculated for static conditions (constant speed and constant current limit) and there is no guarantee that if the actual torque demand is limited to this torque limit, the battery current limit is not exceeded. This is because some of the motor parameters used in this calculation chain are not know very accurate (e.g. stator resistance) and because during current ramp up extra current/power is needed to bring the actual current to the target value.

To accommodate this model error, the apparatus may be configured to monitor the actual motor currents and in the event that the do exceed the limits set may instruct a further reduction in the torque demand limit.

What is claimed is:

1. An electric motor apparatus for controlling an electric motor supplied by a source, such as a battery or a dc/dc converter, in which the electric motor apparatus comprises:
    a controller arranged to produce as an output a set signals that are fed to a drive stage of the motor, in which the drive stage is arranged to apply a voltage to each phase of the motor to cause currents to flow in each phase of the motor corresponding to a current demand signal fed into the controller,
    a torque demand signal modifier that receives as an input a target torque demand signal representative of a target torque demanded from the motor and outputs an actual torque demand signal that is converted into the current demand signal that is fed to the controller, the actual torque demand increasing in value as a function of time towards the target torque demand value following a predefined ramp selected to ensure that the maximum current gradient of the current demand does not exceed a predetermined limit when the voltage supplied by the battery is at a nominal value corresponding to the battery being fully charged,
    wherein the torque demand signal modifier is arranged to modify the predefined ramp as a function of the battery voltage such that the maximum current gradient generated matches a predefined current gradient limit value.

2. An electric motor apparatus according to claim 1 in which the torque demand signal modifier modifies the ramp such that at lower battery voltages the rate of increase of torque demand towards the target at all points along the ramp is boosted compared with a higher battery voltage.

3. An electric motor apparatus according to claim 1 in which the predefined increases the demanded motor torque from zero voltage to a maximum target voltage equal to the battery voltage so that the gradient at the final part of the ramp matches the predetermined gradient limit.

4. An electric motor apparatus according to claim 1 wherein the ramp is boosted when the battery source voltage is lower than the nominal battery voltage.

5. An electric motor apparatus according to claim 4 which boosts the ramp by multiplying the ramp by a scaling factor.

6. An electric motor apparatus according to claim 1 wherein the torque demand signal modifier generates one or more of the current limits as a function of the battery terminal voltage.

7. An electric motor apparatus according claim 1 wherein the torque demand signal modifier determines a torque demand gradient using a model of the motor that includes a plurality of motor parameters which combine at least two or more of: a motor stator equivalent resistance, a motor temperature, a motor mechanical velocity, a motor torque constant, a motor maximum bridge power, and a motor bridge equivalent resistance.

8. An electric motor apparatus according to claim 1 wherein the torque demand signal modifier sets limits for the torque demand gradient based on the battery voltage and a model of the motor parameters that relates the torque to the motor current for a given motor operating condition.

9. An electric motor apparatus according to claim 1 further comprising a current monitor which monitors the actual current demand values from the current controller, or the motor actual current value, or calculates estimates of the current value, and determines an actual current gradient from those values and in the event that the value exceeds the current gradient limit the torque demand gradient limiter is arranged to reduce the amount of boost of the ramp that is applied.

10. An electric motor apparatus according to claim 9 in which the current monitor monitors the actual current values or estimated current values or current demand gradients as part of a feedback control loop so that the torque demand limits are driven to the optimum values to limit the currents drawn from or fed into the battery.

11. A method of controlling an electric motor apparatus of the kind comprising an electric motor and a control circuit, the motor and control circuit being supplied by a battery source, the method comprising the steps of:
receiving a target torque demand signal representative of a target torque demanded from the motor;
generating an actual torque demand signal that increases in value as a function of time towards the target torque demand value following a predefined ramp selected to ensure that the maximum current gradient does not exceed a predetermined limit when the voltage supplied by the battery is at a nominal value corresponding to the battery being fully charged;
producing a set of motor current demand signals from the actual torque demand signal;
applying a voltage to each phase of the motor to cause currents to flow in each phase of the motor corresponding to the current demand signals; and
modifying the predefined ramp as a function of the battery voltage such that the maximum current gradient generated matches a predefined current gradient limit value.

\* \* \* \* \*